United States Patent
Harsham et al.

(10) Patent No.: US 9,434,389 B2
(45) Date of Patent: Sep. 6, 2016

(54) ACTIONS PREDICTION FOR HYPOTHETICAL DRIVING CONDITIONS

(71) Applicant: Mitsubishi Electric Research Laboratories, Inc., Cambridge, MA (US)

(72) Inventors: Bret Harsham, Newton, MA (US); John R. Hershey, Winchester, MA (US); Jonathan Le Roux, Somerville, MA (US); Daniel Nikolaev Nikovski, Brookline, MA (US); Alan W. Esenther, Ashland, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/198,742

(22) Filed: Mar. 6, 2014

(65) Prior Publication Data
US 2015/0142205 A1  May 21, 2015

Related U.S. Application Data

(60) Provisional application No. 61/905,626, filed on Nov. 18, 2013.

(51) Int. Cl.
  *G05D 1/00* (2006.01)
  *G05D 3/00* (2006.01)
  (Continued)

(52) U.S. Cl.
  CPC ........ *B60W 50/0097* (2013.01); *B60W 50/085* (2013.01); *B60W 50/10* (2013.01); *G01C 21/3484* (2013.01); *B60W 2050/0089* (2013.01)

(58) Field of Classification Search
  CPC .......... B60W 2540/22; B60W 10/06; B60W 20/108; B60W 10/08; B60W 2710/0616; B60W 10/10; B60W 10/26; B60W 20/10; B60W 10/02; B60W 30/20; B60W 2510/0208; B60W 10/023; B60W 30/182; G06Q 30/0251; G06Q 40/00; G06Q 20/02; G06Q 90/00; F02D 2041/389; F02D 19/061; F02D 29/02; F02D 17/04; F02D 33/02
  USPC ....... 701/1, 22, 117, 2, 3, 36, 102, 101, 104, 701/108, 112, 400, 103, 100, 54; 340/441, 340/901, 436, 961
  See application file for complete search history.

(56) References Cited

U.S. PATENT DOCUMENTS

| | | | |
|---|---|---|---|
| 6,242,873 B1 * | 6/2001 | Drozdz | B60K 6/46 180/65.1 |
| 7,017,399 B2 * | 3/2006 | Yokohata | G05B 17/02 73/114.31 |

(Continued)

OTHER PUBLICATIONS

Ress et al. "Electronic Horizon—supporting ADAS Applications with Predictive Map Data," Internet Citation, Oct. 10, 2006, pp. 1-8, XP002546070. http://www.prevent-ip.org/download/events/20061008-12_ITS_WC_London/TS067/Paper%201534.pdf, retrieved Sep. 16, 2009.

*Primary Examiner* — Calvin Cheung
*Assistant Examiner* — Luis A Martinez Borrero
(74) *Attorney, Agent, or Firm* — Gene Vinokur; James McAleenan; Hironori Tsukamoto

(57) ABSTRACT

An information system includes a prediction engine for predicting an action based on a set of driving state parameters, and a driving history, and a simulation engine for generating a hypothetical scenario by simulating one or a combination of at least one driving state parameter and at least part of the driving history, such that the prediction engine predicts the action for the hypothetical scenario.

11 Claims, 8 Drawing Sheets

(51) Int. Cl.
  *G06F 7/00* (2006.01)
  *G06F 17/00* (2006.01)
  *B60W 50/00* (2006.01)
  *G01C 21/34* (2006.01)
  *B60W 50/08* (2012.01)
  *B60W 50/10* (2012.01)

(56) References Cited

U.S. PATENT DOCUMENTS

| | | | | |
|---|---|---|---|---|
| 7,233,861 B2* | 6/2007 | Van Buer | G01C 21/3617 | 340/994 |
| 7,274,986 B1* | 9/2007 | Petridis | F02D 41/3076 | 123/295 |
| 7,369,934 B2* | 5/2008 | Chatfield | F02D 11/105 | 123/480 |
| 7,614,384 B2* | 11/2009 | Livshiz | F02D 11/105 | 123/399 |
| 8,370,012 B2* | 2/2013 | Yamada | B60K 6/46 | 180/65.21 |
| 8,392,091 B2* | 3/2013 | Hebbale | F01N 9/00 | 60/274 |
| 8,392,116 B2* | 3/2013 | Lehmann | G01C 21/3438 | 340/991 |
| 8,447,492 B2* | 5/2013 | Watanabe | F02D 41/2432 | 701/101 |
| 8,538,785 B2* | 9/2013 | Coleman | G06Q 40/08 | 705/4 |
| 8,558,682 B2* | 10/2013 | Ono | B60W 40/08 | 340/435 |
| 8,768,616 B2* | 7/2014 | Kristinsson | G01C 21/3617 | 701/424 |
| 9,008,858 B1* | 4/2015 | Payne | B60H 1/00771 | 701/1 |
| 2004/0064235 A1* | 4/2004 | Cole | B60T 8/172 | 701/70 |
| 2005/0131620 A1* | 6/2005 | Bowyer | F02D 41/0007 | 701/108 |
| 2005/0274553 A1* | 12/2005 | Salman | B60K 6/52 | 180/65.28 |
| 2007/0150174 A1* | 6/2007 | Seymour | G01C 21/3617 | 701/532 |
| 2009/0292444 A1* | 11/2009 | Russell | F02D 35/027 | 701/103 |
| 2010/0168998 A1* | 7/2010 | Matsunaga | B60W 30/10 | 701/532 |
| 2011/0202216 A1* | 8/2011 | Thai-Tang | B60W 10/08 | 701/22 |
| 2011/0238289 A1 | 9/2011 | Lehmann et al. | | |
| 2011/0241905 A1* | 10/2011 | Niwa | G01C 21/3682 | 340/995.1 |
| 2013/0073112 A1* | 3/2013 | Phelan | G06Q 40/00 | 701/1 |
| 2013/0103300 A1 | 4/2013 | Rakthanmanon | | |
| 2013/0166096 A1* | 6/2013 | Jotanovic | G01C 21/3617 | 701/1 |
| 2013/0226443 A1 | 8/2013 | Scofield | | |
| 2013/0268150 A1* | 10/2013 | Weslati | G06F 17/00 | 701/22 |
| 2013/0274952 A1* | 10/2013 | Weslati | B60W 50/0097 | 701/1 |
| 2015/0134244 A1* | 5/2015 | Hershey | G01C 21/3617 | 701/489 |
| 2015/0142205 A1* | 5/2015 | Harsham | B60W 50/0097 | 701/1 |

* cited by examiner

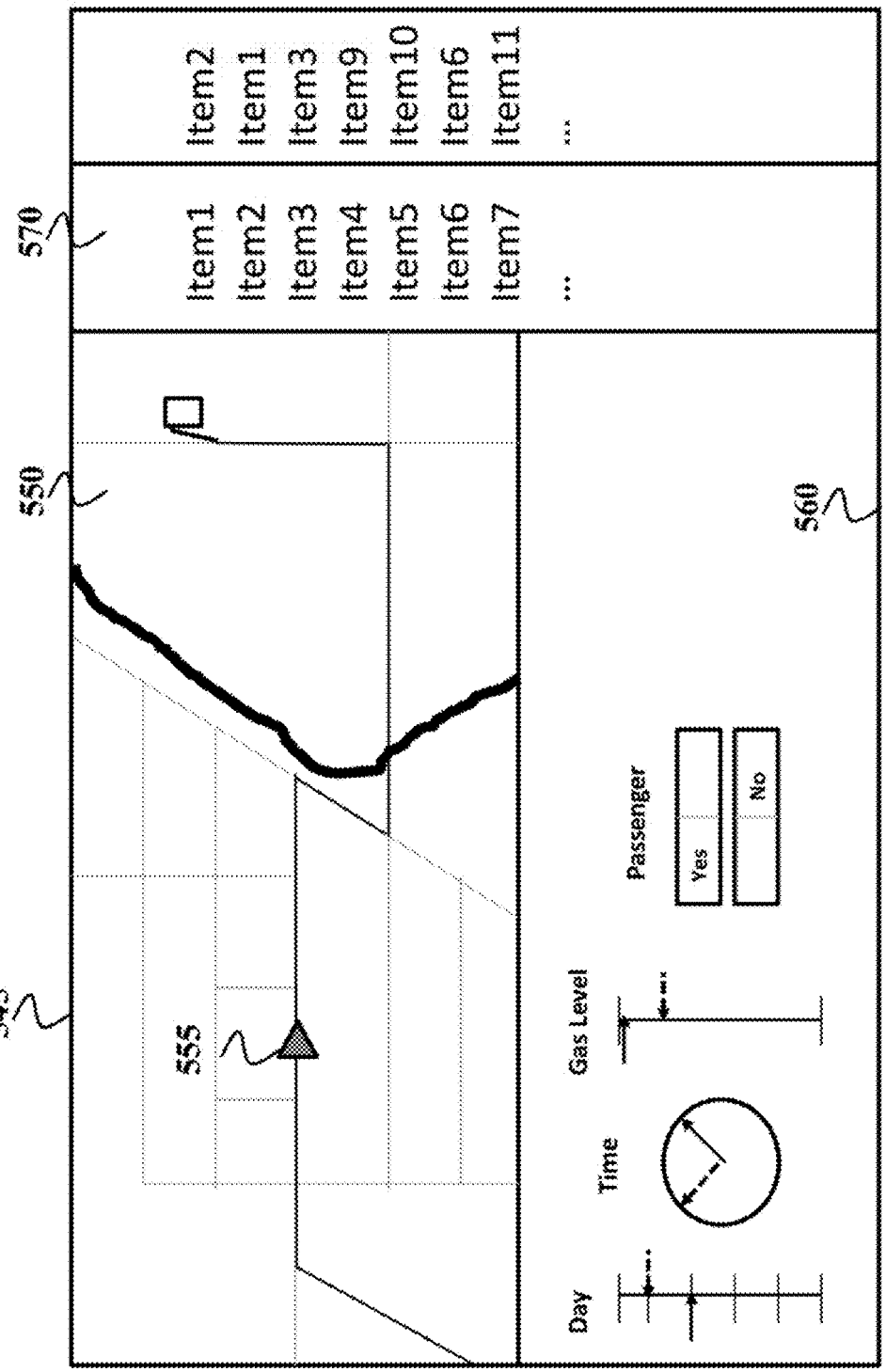

ACTIONS PREDICTION FOR HYPOTHETICAL DRIVING CONDITIONS

RELATED APPLICATIONS

This application claims the priority under 35 U.S.C. §119(e) from U.S. provisional application Ser. No. 61/905,626 filed on Nov. 18, 2013, which is incorporated herein by reference.

FIELD OF THE INVENTION

The present invention relates generally to in-vehicle information systems, and more particularly to actions prediction for hypothetical driving conditions of a vehicle.

BACKGROUND OF THE INVENTION

An in-vehicle information system (IVIS) can help a driver operate a vehicle. For example, the IVIS can inform the driver on the remaining fuel, tire pressure, or a best route to a destination. Similarly, the IVIS can assist the driver to make a telephone call, select music, or download an application using the Internet. To assist the driver, the IVIS needs an interface for communicating with the driver or passengers in the vehicle.

Until recently, the actions performed by the IVIS were deterministic. The IVIS reacted on the actions of the driver or a change in the road conditions in a way predetermined by the designers of the IVIS. Accordingly, the communication interface of the IVIS was designed to streamline the exchange of the current information. For example, the IVIS can turn ON the light to indicate that the current level of the remaining fuel is low. Similarly, the IVIS can command the navigation system to select the best road based on a currently selected destination and a current location of the vehicle. Accordingly, the communication interfaces of the various IVIS were designed to receive current information from the modules integrated into the vehicle and from the driver. For example, the current information can include the current location, the current time, the current traffic conditions, and the current destination.

The introduction of predictive modules into the IVIS allows the IVIS to act probabilistically to predict the possible actions and/or desires of the drivers. For example, U.S. Pat. No. 7,233,861 describes a method for predicting destinations and receiving vehicle position data. The vehicle position data include a current trip that is compared to a previous trip to predict a destination for the vehicle. A path to the destination can also be suggested. Similarly, U.S Patent Publication 20110238289 describes a navigation device and method for predicting the destination of a trip. U.S. Patent Publication 20130166096 describes a predictive destination entry system for a vehicle navigation system to aid in obtaining a destination for the vehicle.

Those methods predict the possible destinations based on the past and the current information. For example, the past information is collected based on the history of the operating the vehicle and the current information is determined by the modules of the vehicle.

SUMMARY OF THE INVENTION

The embodiments of the invention provide a system for communicating between a driver and an in-vehicle information system (IVIS) to determine hypothetical future events.

For instance, at a car dealership, the utility of a prediction engine enables potential buyers to view predictions based on a combination of current and past conditions as well as based on the hypothetical conditions selected during the demonstration. The hypothetical conditions can be varied in a more natural way, thus allowing a more compelling demonstration. For example, the current conditions can include a history of trips made on weekdays, and the potential buyers can change the time of the day or time of the week to compare the prediction of those hypothetical with their own experience.

Similarly, providing the hypothetical scenarios can assist in trip planning. If the system allows the user to build a set of related hypothetical scenarios, then predictions for each scenario can be generated, and used for research and planning.

Accordingly, various embodiments are based on recognition that there is a need for simulation mechanism that in combination with the prediction engine of the IVIS can simulate the operation of the IVIS in various hypothetical situations.

Some embodiments are based on a realization that the prediction engine makes the predictions based on various parameters of the state of the driving including parameters determined based on the driving history of the vehicle or the user and parameters independent from the driving history and determined by the modules of the vehicle. For example, the independent parameters can include a current location of the vehicle, a time of the day, a type of the day, e.g., weekday, weekend or holiday, the time of the year. Various embodiments of the invention are based on the realization that by changing or overriding the driving state parameters used by the prediction engine to make the predictions, various hypothetical scenarios for the user can be generated.

For example, one embodiment discloses an in-vehicle information system, comprising a prediction engine for predicting an action based on driving state parameters, and a simulation engine for changing at least one driving state parameter to create a hypothetical scenario, such that the prediction engine predicts the action for the hypothetical scenario.

The driving state parameters can include parameters determined by the prediction engine based on a driving history of the vehicle and parameters independent from the driving history. Thus, in some embodiments, the in-vehicle information system includes at least one system module for determining the driving independent parameters. In one embodiment, the simulation engine modifies one or several driving independent parameters.

In various embodiments, the parameters are used by various modules of the in-vehicle information system in addition to the simulation engine. For example, such parameter as a current time can be used by the prediction engine to predict the action and by a clock installed in the vehicle for displaying time. The simulation engine modifies the parameters as received by the prediction engine, without modifying the parameters as used by other modules of the in-vehicle information system. In some embodiments, the in-vehicle information system includes a user interface for providing values of the parameters to be modified.

Accordingly, one embodiment discloses an information system including a prediction engine for predicting an action based on a set of driving state parameters, and a driving history; and a simulation engine for generating a hypothetical scenario by simulating one or a combination of at least one driving state parameter and at least part of the driving history, such that the prediction engine predicts the action for the hypothetical scenario.

Another embodiment discloses a method for using a prediction engine of a vehicle, wherein the prediction engine predicts an action based on a set of driving state parameters and a driving history. The method includes creating a hypothetical scenario by modifying one or combination of at least one driving state parameter and at least part of the driving history; and providing the hypothetical scenario to the prediction engine, such that the prediction engine predicts the action for the hypothetical scenario. The steps of the method are performed by a processor.

BRIEF DESCRIPTION OF THE DRAWINGS

FIG. 5B is a diagram of a user interface for use in an automotive showroom context according to one embodiment of the invention.

DETAILED DESCRIPTION OF THE PREFERRED EMBODIMENTS

Figure 1:
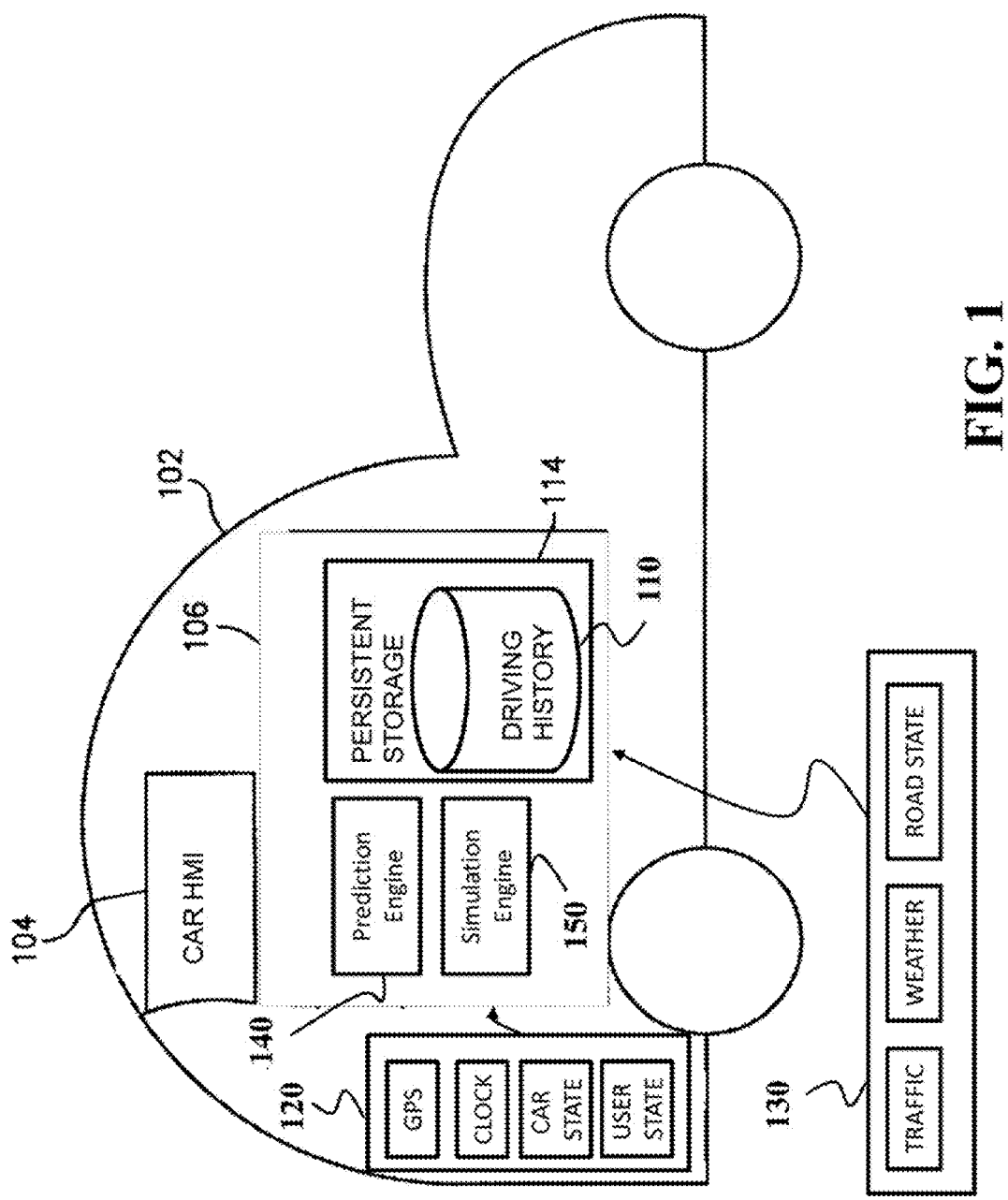
FIG. 1 is a schematic of an example of an information system of a vehicle for establishing a hypothetical driving scenario according to various embodiment of the invention.

FIG. 1 shows an example of an information system 106 of a vehicle 102 for interacting with a driver to establish a hypothetical driving scenario and for generating user action and/or driving predictions for that scenario. The system also has the capability to communicate the predictions to a user of the system.

The system includes a processor, e.g., a central processing unit (CPU), for controlling the operation of the system. The system interacts with a persistent storage device 114, which includes software related to an operating system (OS) of the system, application programs that can be executed by the CPU to provide specific functionalities to a user of the system, and software related to predicting user actions and driving actions. The system further includes a car human-machine-interface (HMI) 104 including input and output interfaces. For example, the HMI can be connected to one or more input devices such as a touch screen, buttons, a keyboard, or a speech input device, and one or more output devices such as a screen or speakers for audio feedback.

In one embodiment, the persistent storage of the system includes one or more storage areas dedicated to storing the driving history 110 of the system. The driving history can include current and past information about driving of the vehicle and/or a driver of the vehicle. For example, the driving history can include information about the state of the vehicle, previous and/or current locations and/or destinations of the vehicle, the state of the area surrounding the vehicle, and the state of the larger world at particular times in the past. In alternate embodiments, the driving history is stored on an external memory device or server.

The system can further include sensors that regularly detect the current state of the vehicle and its surroundings. The sensors can be internal sensors 120 installed in the vehicle. The internal sensors 120 can include one or combination of a clock, a global positioning system (GPS), and sensors that detect the state of the various physical and electric components of the car, such as sensors that detect seat occupancy, door position, lighting status, and/or the state of the HMI. The system can further include sensors that detect the user state of the occupants of the vehicle, e.g., sensors that detect physical state such as head position, eye-gaze direction, or heart-rate.

The system can be operatively connected with external sensors 130 that are not located in the vehicle, but which supply information about the external environment. These external sensors can communicate with the processor over a network. For example, such external sensors 130 can include sensors that supply information about traffic, weather, or road state. Some embodiments can use external state information provided by external services that are available on a network. In the some embodiments the internal and/or external sensors are real-time, i.e., the sensors provide instantaneous information about the state of the world. In other embodiments, the sensors can include external sensor data sources that act in batch mode, that is, where information is provided about past states. Such past information is integrated into the driving history.

The system 106 also includes a prediction engine 140 for predicting what the user and/or the vehicle will do next based on the current state of the driving and the driving history. The current state of the driving can be represented by a set of driving state parameters, such that the prediction engine predicts the action based on the set of driving state parameters and the driving history. The action can include one or combination of user actions or vehicle actions. For example, the action can be a placing a telephone call for a user, or driving to the nearest coffee shop.

The system 106 also includes a simulation engine 150 for creating a hypothetical scenario, such that the prediction engine 140 predicts the action for the hypothetical scenario, as contrasted with the prediction of the actual scenario. In some embodiments, the simulation engine creates a hypothetical scenario by simulating one or combination of at least one driving state parameter and at least part of the driving history. In this manner, the hypothetical scenarios can be created without modifying the prediction engine and the actual driving state parameters and the driving history.

For example, in some embodiments, the system 106 can also include a system module using the driving state parameter. In those embodiments, the simulation engine modifies only a copy of the driving state parameter used by the prediction engine without modifying the driving state parameter used by the system module.

In one example, the driving state parameter is a current location of the vehicle, and the system module is a navigation system of the vehicle. In this example, the simulation engine changes the current location of the vehicle as used by the prediction engine without changing the current location of the vehicle used by the navigation system.

In another example, the driving state parameter is a current time or a calendar date, and the system module is a clock or a calendar system of the vehicle. In this example, the simulation engine changes the current time or the calendar date for the prediction engine without changing the current time or the calendar date used by the clock or the calendar system. Notably, in this example, the driving state parameter has a value independent from the driving history, and the simulation engine modifies the value of that driving state parameter.

Figure 2:
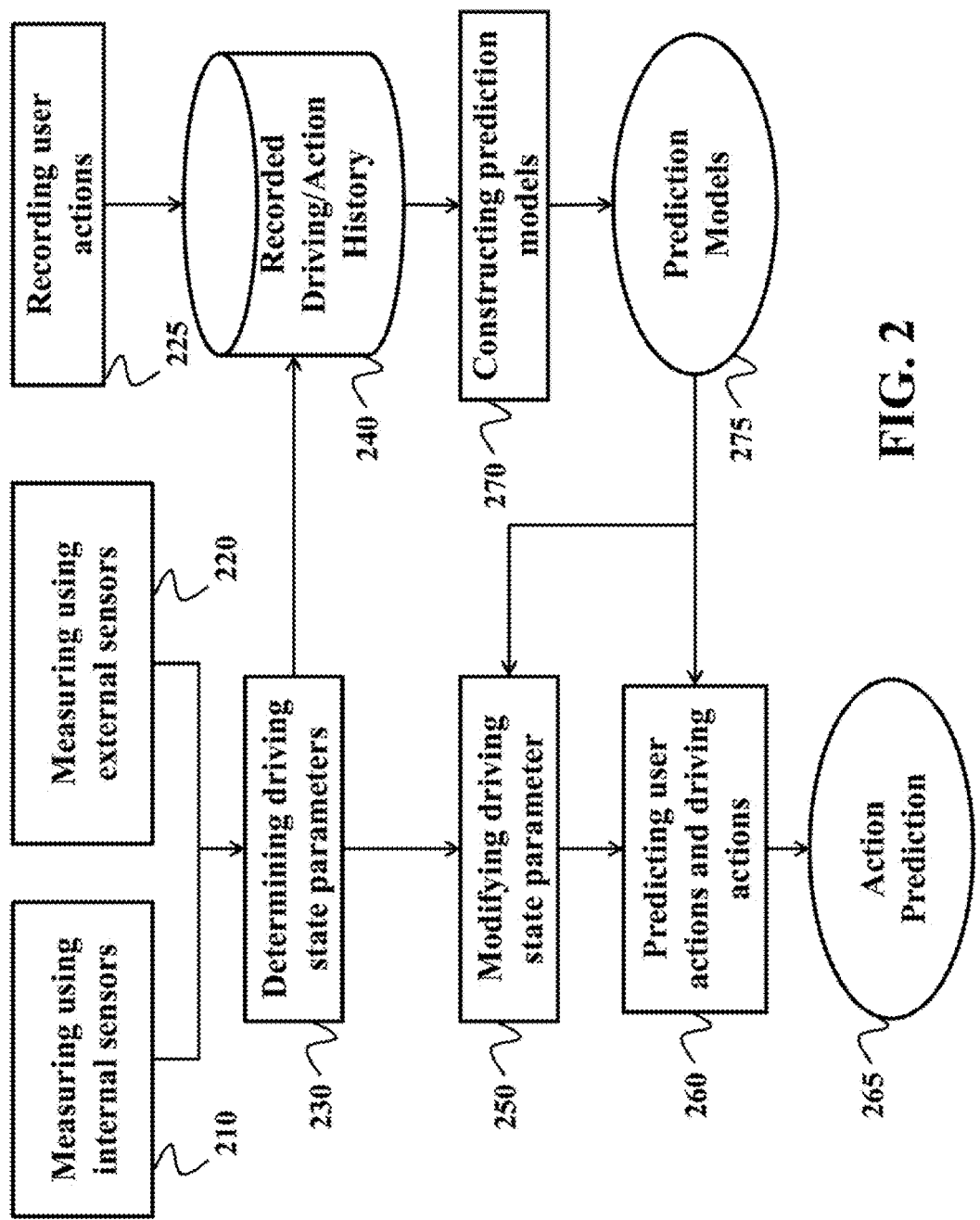
FIG. 2 is a block diagram of a system for predicting an action for actual and/or hypothetical scenario according to some embodiments of the invention.

FIG. 2 shows a block diagram of a system for predicting an action for actual and/or hypothetical scenario according to some embodiments of the invention. The system collects measurements from internal 210 and/or external 220 sensors and processes the measurements to determine 230 the set of driving state parameters at a particular time. Such processing can include direct use of sensor measurements, downsampling, averaging measurements over time, coarse-coding, and other forms of statistical and/or mathematical analysis that result in derived measures of the car state. The processing can also use the driving history. The set of driving state parameters can thus represent either the instantaneous state of the vehicle, or a representation of the both the instantaneous state and some part of the state history.

The system also comprises a module that records 225 information about actions performed by the user while driving. These actions can be detected by any HMI that the user interacts with and/or by sensors that detect the physical state of the user.

Some embodiments include a driving history module for collecting 240 the driving history of the vehicle or actions 225 of a driver of the vehicle and for creating 270 a prediction model 275 for the prediction engine. For example, each record of driving state parameters computed for a particular time is recorded 240 as the driving history, which thus includes a history of the driving states and user actions at various times in the past. The driving history as stored can include a full representation of all past time records, or a sparse history where particular types of data are only stored at times of interest. User actions of interest can also be stored in the driving history.

Some embodiments analyze the driving history to reveal driving actions of long duration. For instance, when the vehicle arrives at a particular location, this action can be determined and added to the time records for all driving states during the trip which resulted in arriving at the destination.

In some embodiments, the driving history is used to construct 270 prediction models 275, which associate particular combinations of driving state parameters with user actions and driving actions of interest. In one embodiment, the prediction models are constructed using statistical methods of analysis such as machine learning techniques. Some embodiments can also include rule based associations between particular combinations of driving state parameters with user actions and driving actions of interest.

The prediction models can be built regularly, or as needed. The prediction models can be built locally by the system in the vehicle, or externally by an external system or service.

The prediction engine uses the associations in the prediction models in order to make predictions of what user action and driving conditions are likely to occur given the current driving state parameters and the driving history. One embodiment uses machine learning techniques to generate 260 the prediction of the action 265, but any other form of prediction technique can be used.

The simulation engine of various embodiments create the hypothetical scenario by modifying 250 one or combination of at least one driving state parameter and at least part of the driving history. For example, modification of the driving history can be used to simulate one scenario for different users. Modification of the driving state parameters can simulate different scenarios for the same users. The combination of modifications of driving state parameters and driving history can simulate different scenarios for different users.

Figure 3A:
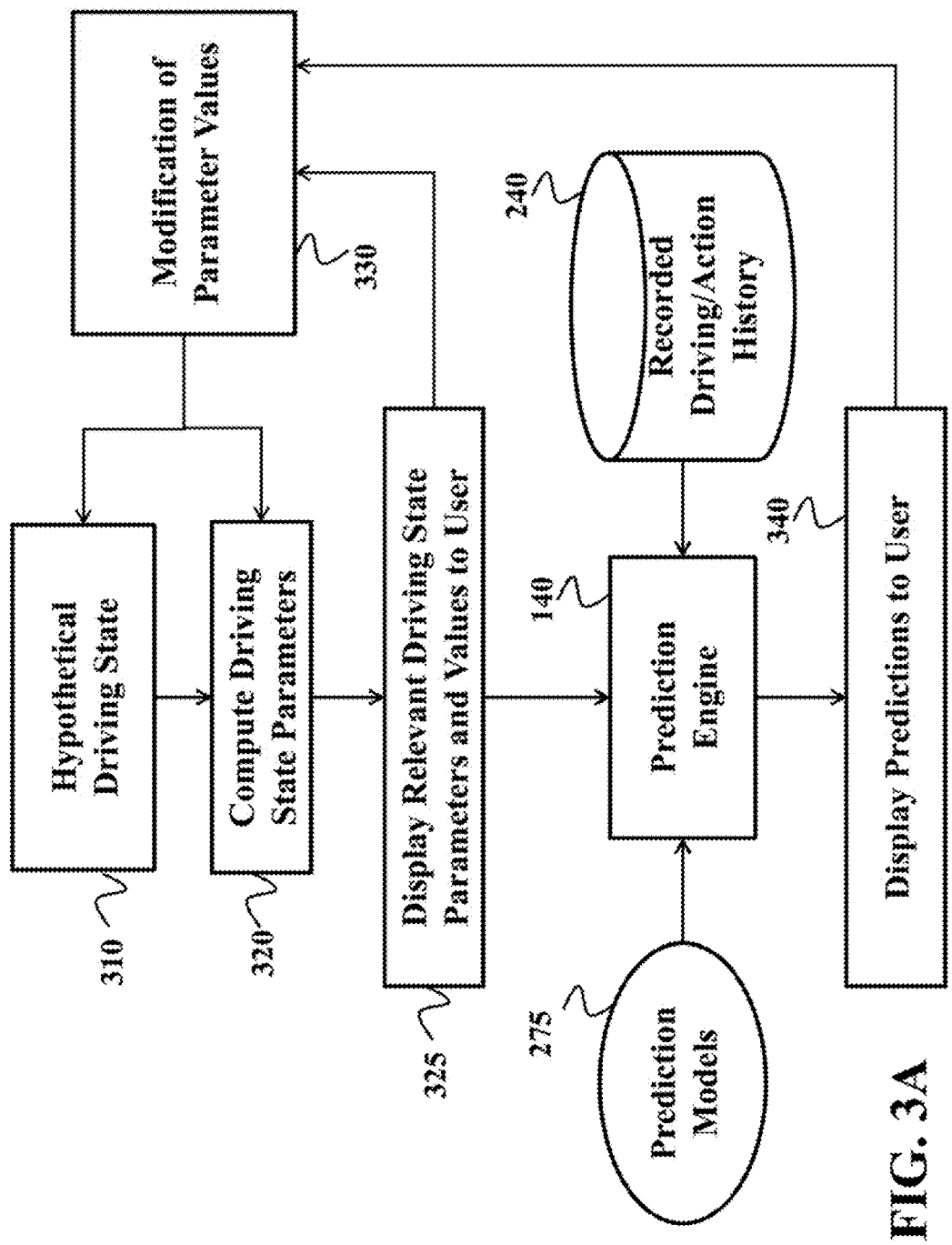
FIG. 3A is a block diagram of a method for predicting actions for a hypothetical driving state according to one embodiment.

In addition, such modifications allow creating hypothetical scenarios without altering the actual state of the system. For example, the simulation engine can modify only a copy of the driving state parameter used by the prediction engine. Similarly, the simulation engine can modify the prediction model without changing the driving history FIG. 3A shows a block diagram of a method for predicting actions for a hypothetical driving state according to one embodiment. A hypothetical driving state 310 can include the set of driving state parameters 320, which in turn can include a set of measurements of the sensors and/or other parameters values. For example, if a set of values for particular sensors is given, then at least part of the driving state parameters is computed from the set of sensor values. If a set of driving state parameters is given, this set can be used directly. The initial hypothetical driving state can be a recorded set of values selected from a particular time in the recorded history.

A subset of the driving state parameters is displayed 325 to the user. The display can be accomplished by using actual or virtual meter displays, showing sensor or parameter values, using audio feedback to communicate something about the set of driving state parameters, or any other form of output which informs the user about the status of the current set of values. The user can modify 330 the values of the driving state parameters by altering the hypothetical driving state or by directly modifying the set of driving state parameters.

The prediction engine 140 is used to generate predictions of user actions for the specified hypothetical driving state, in the manner similar to prediction for a current driving state, but using the specified and computed driving state parameters instead of current state parameters.

The generated predictions are communicated 340 to the user by means of a display or other output device. In one embodiment, the generated predictions are shown as a ranked list and/or as icons on a map.

In one embodiment the HMI includes controls to modify the values of particular sensor or driving state parameters. Manipulation of these controls by a user can result in the value(s) of one or more sensor or parameter being modified. When a parameter or sensor value is modified, a new hypothetical driving state is created, resulting in new predictions which can be displayed to the user.

Some embodiments include various affordances for the user to view the difference between one hypothetical driving state and another. For instance, various graphical markings can be overlaid on a sensor meter in order to show two different hypothetical values. One embodiment also uses this display technique to show the difference between a recorded value and a modified value.

Some embodiments also provide a possibility for the user to view the difference between the predictions generated for one hypothetical driving state and the predictions generated for another hypothetical driving state. For instance, predictions for two driving states can be shown next to each other so that a user can visually inspect them for differences. In some embodiments, two or more sets of predictions can be overlaid with only the differences highlighted. Various graphical techniques are used by embodiment for displaying the difference between two similar sets.

One embodiment also includes an updating display showing a sequence of hypothetical driving states and predictions corresponding to a trip. The location of the vehicle during the trip can be shown on a map display. The location, driving parameters, and predictions are updated for each state in the sequence. Control of the change between states can be automatic in response to some activation event, or can be fully controlled by the user, or some combination thereof.

Figure 3B:
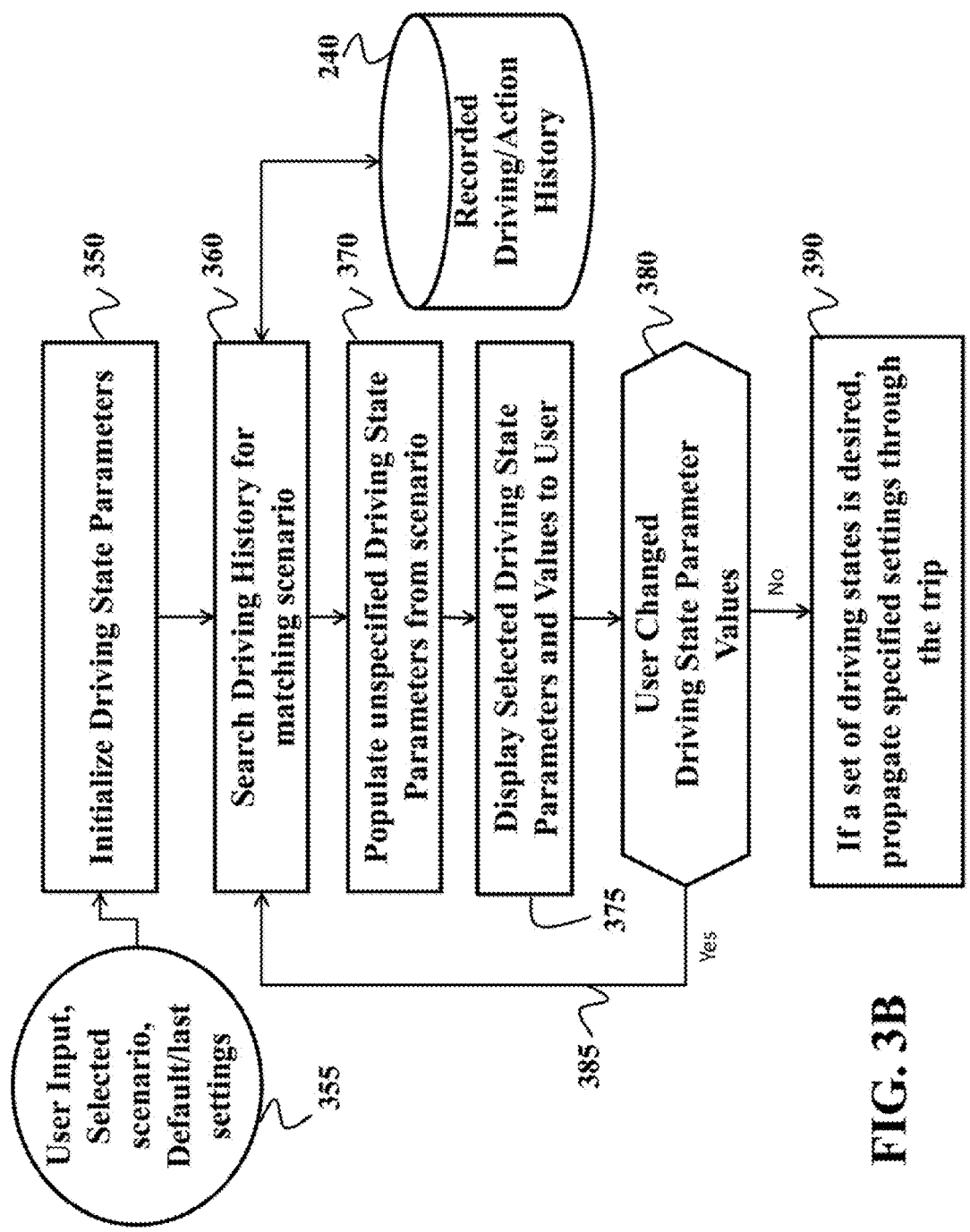
FIG. 3B is a block diagram of a method for interaction between a user specifying a hypothetical driving state and the information system according to some embodiments of the invention.

FIG. 3B shows a block diagram of a method for interaction between a user specifying a hypothetical driving state and the information system 106 according to some embodiments of the invention. The hypothetical driving state is initialized 350 to a particular set of driving state parameters. In some embodiments, the current driving state parameters can be used 355 to initialize the hypothetical driving state. In some embodiments, a hypothetical driving state can be initialized to a previously generated hypothetical driving state. In some embodiments, the hypothetical driving state can be initialized a previously recorded driving state.

In some embodiments, a user can specify 355 a few values for driving parameters, for instance, that the day of week is Tuesday, and that the time is 7 PM. When some driving state parameters are initialized and some are unspecified, then the other parameters can be populated 370 from similar conditions in the driving history. In one embodiment, the specified parameters can be used as the basis for a search 360 to find one or more trips from the driving history which best match the specified parameters using a similarity metric. Many similarity metrics can be used for this purpose. A trip is a sequence of related, e.g., in time or place, hypothetical driving states.

After the driving state parameters have been fully populated, a subset of parameters can be shown 375 to the user for refinement of the driving state. The user can be, e.g., a driver or a passenger in the vehicle.

In one embodiment, the system 106 includes an input interface having controls to modify 380 the values of particular driving state parameters. Manipulation of these controls by a user can result in the value(s) of one or more parameters being modified. In some embodiments of the system, parameter modification can cause 385 a new search of the driving history to be performed to find a new driving state or trip which is most similar to the new set of specified parameters.

In addition, after the driving state parameters are populated, if the user specified a trip, then the system can propagate 390 the specified parameters through all of the driving states of the trip.

Figure 4:
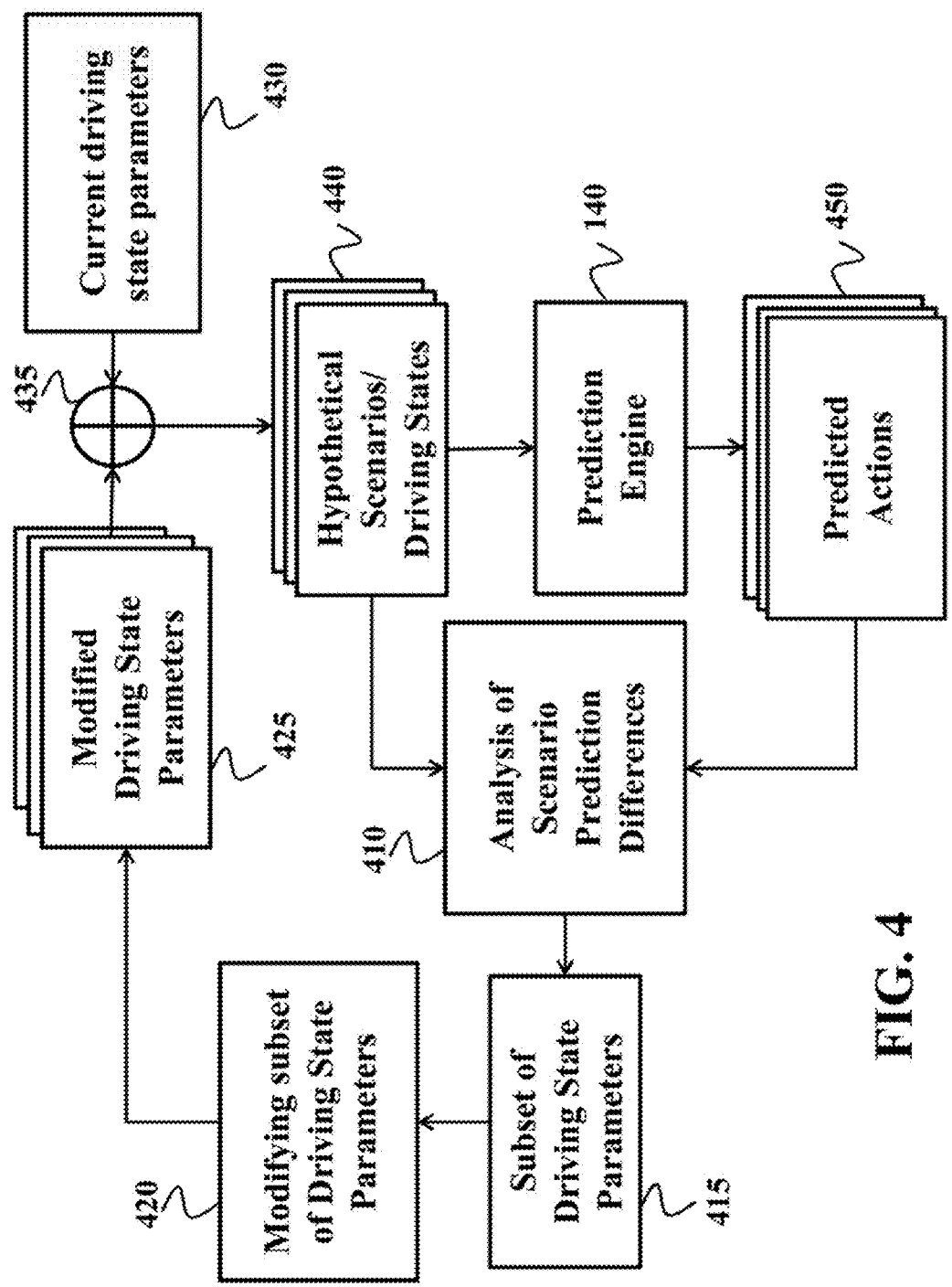
FIG. 4 is a block diagram of a system for selecting driving state parameters to be modified according to one embodiment of the invention.

FIG. 4 shows a block diagram of a system for selecting driving state parameters to be modified according to one embodiment of the invention. This embodiment is based on recognition that modification of different parameters can have different degrees of impact on the predicted action. Also, for some uses, it is desirable to limit the set of parameters that can be varied.

Accordingly, in some embodiment of the invention, the information system 106 includes an analytical module 410 for performing an analysis of a set of actions 450 predicted 140 for a set of hypothetical scenarios 440 and for determining a subset 415 of driving state parameters based on the analysis. The embodiment also includes an interface for modifying 420 values of at least some driving state parameters in the subset, and a processor for determining the set of hypothetical scenarios 440 using the modified values of the driving state parameters.

For example, the interface can include an output interface for rendering the subset of driving state parameters to be modified and an input interface for modifying values of at least some driving state parameters in the subset. In some embodiments, the output interface displays concurrently multiple actions and multiple corresponding hypothetical scenarios. Also, the processor can simulate 435 multiple sets of the driving state parameters by combining the modified parameters 425 with other parameters 430 of a current driving state.

For example, at any given point in time, the prediction engine 140 processes an input feature vector of driving state parameters describing the state of the vehicle and the driver, and outputs a list of most likely actions that the driver can do next, along with the respective probabilities of them happening. When demonstrating the operation of the prediction engine in a given situation, it is desirable to know which of the individual components of the input vector would impact the prediction the most, if changed. To this end, the analytical module 410 of some embodiments determines a measure of the impact of changing a single input variable feature, while holding all other features at their current values.

Several impact measures are possible. Some of the impact measures are calculated by comparing the probability distribution of the predicted actions before and after a tentative change in the input feature under consideration. Let $P_i$ be the predicted probability of action $A_i$ when the current input vector is used for prediction without modifications. In this case, the values $P_i$ form a probability mass function over the domain of all actions. Similarly, let $Q_i$ be the predicted probability of action $A_i$ when the input feature under consideration is modified in an appropriate manner. (For Boolean features, the modification will be to the opposite logical state; for continuous feature, the modification can be setting the value to one of its extreme permissible values.) The impact measures described below compare the two probability mass functions P and Q.

One possible measure is the Kullback-Leibler (KL) divergence between the two probability mass functions P and Q, defined as $$D_{KL}(P\|Q) = \sum_i \log\left(\frac{P_i}{Q_i}\right) P_i.$$

The more the two distributions differ, the larger the KL divergence between them is. However, the difference between the two distributions, and hence the KL divergence between them, is not directly related to the change in recommended actions that a human driver would see. The reason is that the driver does not see these distributions directly—rather, he/she sees only the relative order of the recommended actions. For this reason, an impact measure based on changes in order would be more appropriate.

One such measure based on order is the Kendall tau distance between two sorted lists. Let $\tau_1(i)$ be the ordering of actions $A_i$ before the feature change, that is, $\tau_1(i)$ contains the position of action $A_i$ in the list of actions sorted according to their probabilities $P_i$ in descending order. Similarly, let $\tau_2(i)$ be the ordering according to the predicted probabilities $Q_i$ after the feature change, in the same (descending) order. Then, the Kendall tau distance between the two orderings $\tau_1(i)$ and $\tau_2(i)$ is proportional to the number of action pairs for which the relative position in the two orderings is different:

$$K(\tau_1,\tau_2)=|\{(i,j):i<j,(\tau_1(i)<\tau_1(j)\cap\tau_2(i)>\tau_2(j))\cup(\tau_1(i)>\tau_1(j)\cap\tau_2(i)<\tau_2(j))\}|$$

However, this measure is sensitive to changes in the order everywhere in the sorted list, including the bottom of the list, which is not likely to even be seen by the driver. Since changes in the top of the list are most important and visible by the driver, the distance can be modified to count only changes in order that affect only the top-k items in both orders, if the driver sees only the top k recommendations. This would result in distance increase recorded when either an action drops from the visible list, or enters the visible list, or two actions change their relative positions on the visible list. The modified distance measure then is:

$$K'(\tau_1,\tau_2)=|\{(i,j):\tau_1(i)\leq k\cup\tau_2(i)\leq k\cup\tau_1(j)\leq k\cup\tau_2(j)\leq k, (\tau_1(i)<\tau_1(j)\cap\tau_2(i)>\tau_2(j))\cup(\tau_1(i)>\tau_1(j)\cap\tau_2(i)\leq\tau_2(j))\}|$$

Various embodiments use different distance measures, for instance one of the measures described above, in order to select a subset of features to display to the user for use in modifying features during simulation.

One embodiment determines a subset of driving state parameters to be modified. For each parameter in the subset, a range of possible values is generated. The cross product of all of the possible values can be modified 425. Each of these lists of parameters and values can be combined with a current, recorded, or hypothetical driving State, by setting the varying parameters of the driving state to the values indicated by the list. This results in a set of hypothetical driving states. For each hypothetical driving states, the prediction engine is used to generate predictions for that hypothetical state. The predictions are compared with a similarity metric as described above. Parameters that result in lower similarity are selected. This process can be repeated iteratively, modifying the initial driving state, the set of candidate parameters, and/or the range of possible values for each parameter on each iteration in order to explore the space of parameters that can be changed.

Another embodiment starts with a trip (a related sequence of driving states) and varies the parameters across the entire trip. The sequence of predictions for a trip and for one parameter setting is a "hypothetical scenario". In this embodiment, the similarity measure is used to compare hypothetical scenarios in addition to comparing single driving states to each other, and parameters resulting in lower similarity across trips are selected. Selection of driving state parameters can be performed ahead of time, or as needed for use with a particular trip or driving state.

One embodiment of the invention uses automatic selection of driving state parameters after a hypothetical driving scenario is specified by a user. In this embodiment, these parameters are preferred when showing controls to the user for simulation.

EXAMPLES

Some embodiments of the invention are used to demonstrate the efficacy of the simulation engine in a showroom environment. One of the features of a car showroom is that there is no current driving state, because there is not a car currently being driven, and there is usually no history recording the habits of the particular customer who is looking at a car. For this use case, the prediction engine can run on a computational platform different from a car infotainment system, and can include a desktop computer, or a mobile device.

Showroom Example

Figure 5A:
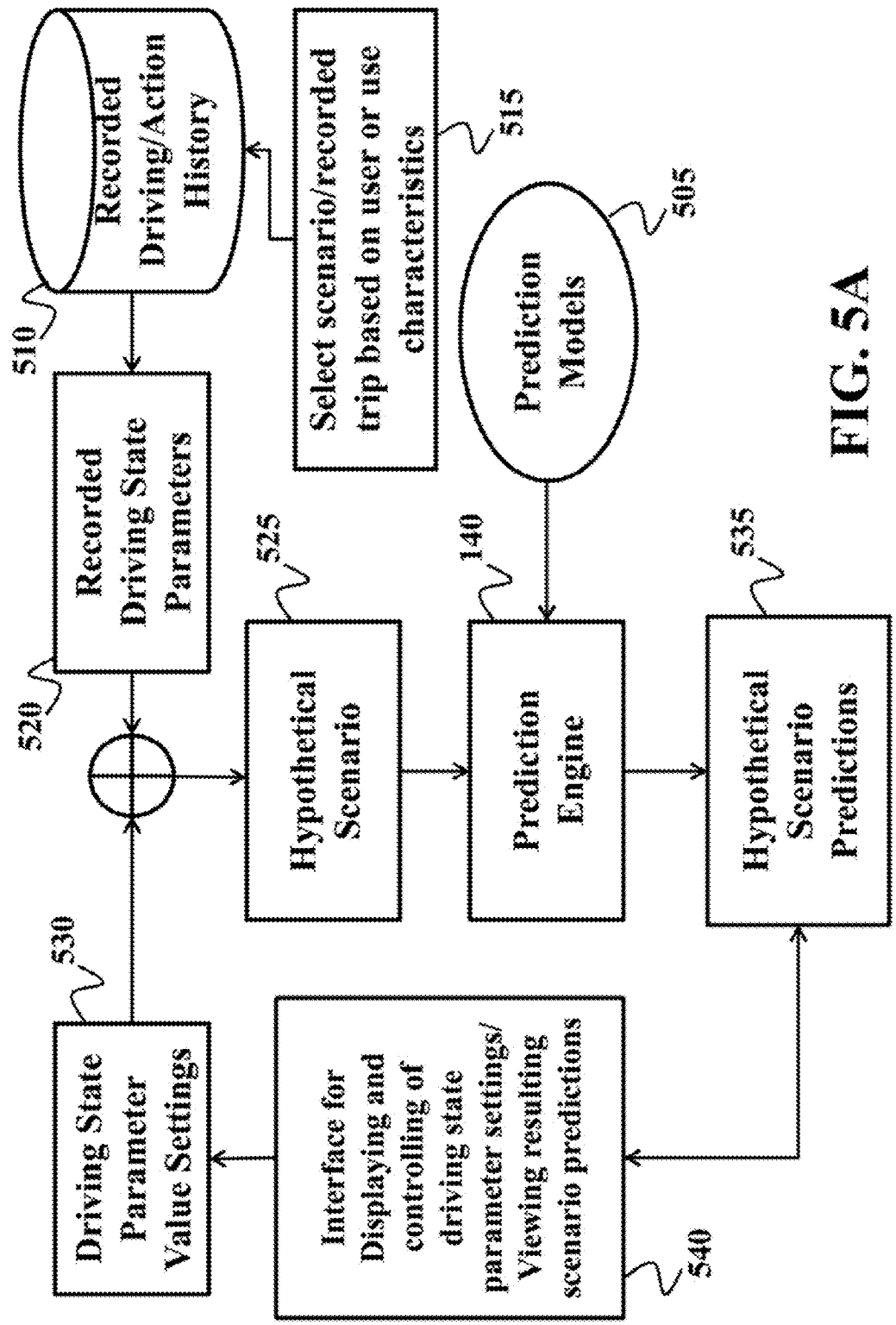
FIG. 5A is a block diagram of a demonstration system for use in an automotive showroom context by some embodiments of the invention.

FIG. 5A shows a block diagram of a demonstration system for use in, e.g., an automotive showroom context in some embodiments of the invention. It should be understood that this description discloses an embodiment for this use case which has some particular features that are specific to the use case. Not all embodiments of the invention have all of these features.

In this embodiment, simulation is based on recorded trips that exist in the driving history. The driving history can include trips that were recorded by one or more drivers in one or more vehicles. A scenario is a sequence of one or more driving states corresponding to a particular range of time as defined by a start and stop time. Such start and stop times can be selected to correspond to the actual times at which a driver started driving and arrived at a destination, or the start and stop times can be selected by some alternate selection method.

In this embodiment, the block 515 labeled "Select scenario/recorded trip based on user or use characteristics" is an interaction in which a user, e.g., a customer or a salesperson, begins by specifying some general attributes of the customer, such as age, gender, area of residence, type of driver. Simple user interface affordances can be provided for the user to specify these or other attributes. In addition, some driving parameters, for example time of day, day of week can also be specified.

A search of the driving history 510 is performed for one or more trips (scenarios) that have parameters 520 similar to those specified. One of these scenarios becomes the initial hypothetical scenario. In some embodiments a user can select one scenario 525 from a list of scenarios matching the search.

Selection of driving state parameters 530 for modification can be performed at this point through an interface 540 based on the specific scenario selected, in order to increase the difference of prediction that will result as the user modifies the parameters.

One driving state in the scenario is selected as the initial hypothetical driving state. This can be a first driving state, a last driving state, or any state where something interesting happened. The initial driving state can be chosen automatically or it can be chosen by a user. The prediction engine 140 is used to make a series of predictions for some or all of the driving states in the hypothetical scenario 525. These predictions are the Hypothetical Scenario Predictions 535 for the particular hypothetical scenario.

This embodiment further includes an interface 540 which has controls suitable for displaying the driving state parameters for the hypothetical scenario to a user.

Some of the parameters to be displayed can be selected according to the method of FIG. 4. Some of the parameters to be displayed can be selected by a user interface (UI) designer for their meaning to a user. Many kinds of UI controls exist for displaying a value and/or selecting a new value. It should be understood that any suitable UI control can be used.

When a user selects new settings for one or more driving state parameters, the interface block records the selected or modified values 530. The modified values can be extended for the entire scenario, and combined with the recorded driving state parameters for the scenario to create a new hypothetical scenario.

This embodiment can render the difference between two related hypothetical driving states. In particular, comparing the state that occurred at the same time instant in two hypothetical scenarios where the driving parameters differ from each other. For example, this embodiment includes controls that show the value for a particular parameter in both scenarios. The controls further allow the user to select a new value setting for the parameter, thus creating a new hypothetical driving scenario.

The interface 540 can further include visualizations for viewing the lists of predictions that were generated for the two related driving states. The two lists of predictions (one for each related driving state) can be displayed to the user separately or combined. In other embodiments, more than two related hypothetical driving states and predictions can be displayed to the user concurrently.

Figure 5B shows a diagram of a user interface 545 for use in an automotive showroom context. This UI includes the capability to display and control selected driving parameters and the capability to view the resulting predictions.

The UI in this embodiment comprises a map visualization 550 showing locations 555 of the vehicle at each recorded time corresponding to a driving state. It is useful, but not necessary, to include some animation in the UI so that the trip can be viewed over a short time.

The UI also includes a parameter setting and control visualization section 560 showing values of several selected parameters. The diagram shows how each control can show several values for a parameter, for instance, the actual value as it was recorded and the value according to the current simulation. Some parameters, such as the day of week, have limited possible values that they can take. These parameters are best represented by controls that allow limited values. Other parameters, such as the time of day, have unlimited values (within a range), and are best represented by controls where the setting appears to be unconstrained within the possible range.

The UI can further include visualizations for the predictions for the hypothetical scenario being simulated. The UI 545 uses parallel lists 570 to display predictions for the actual trip as recorded and the hypothetical scenario according to the current simulation.

Trip Selection Example

Figure 6:
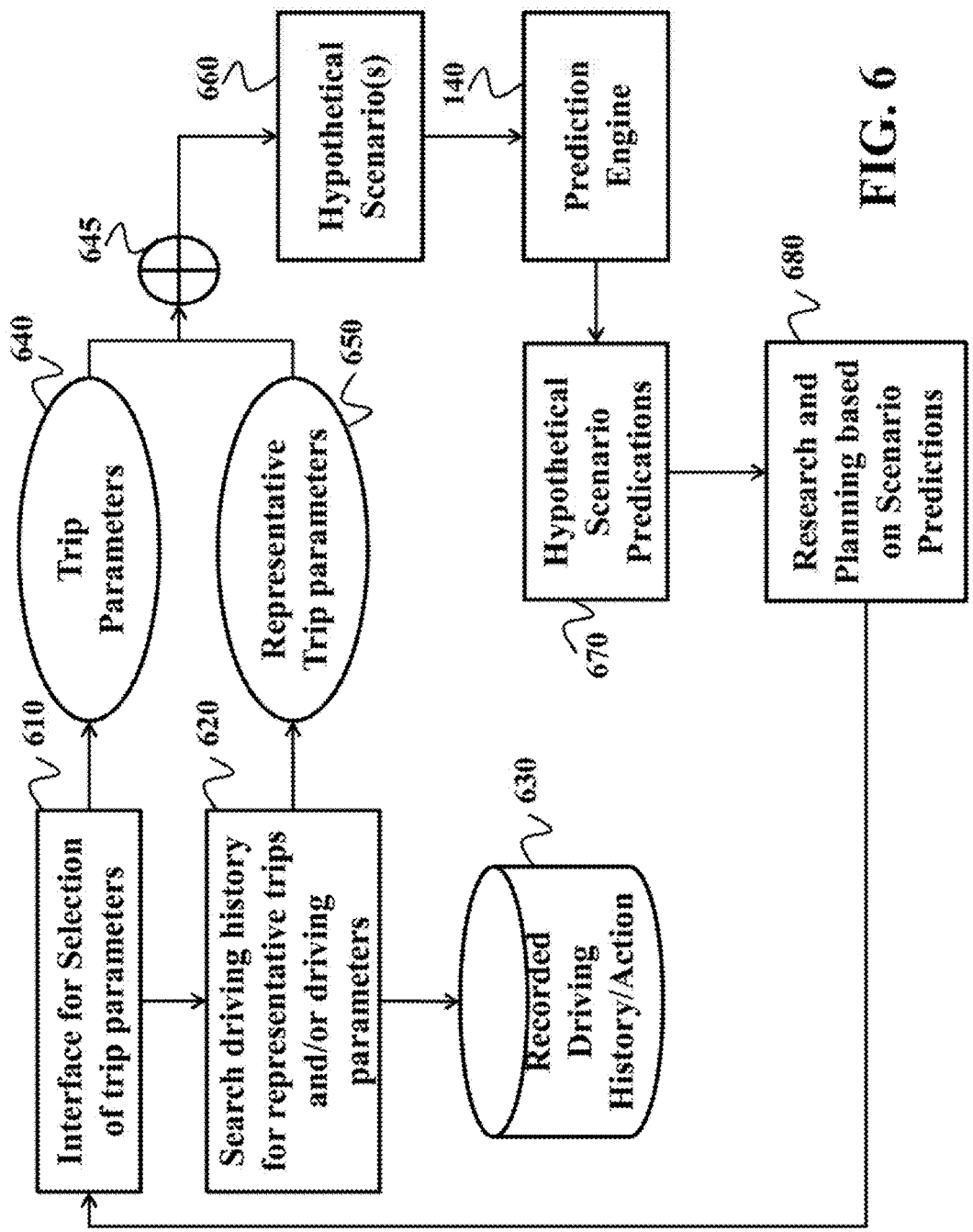
FIG. 6 is a diagram of a method for considering a trip to a new location according to one embodiment of the invention.

FIG. 6 shows a diagram of this example, in which a driver with existing recorded history is considering a trip to a new location, e.g. a business trip, or vacation, or to a known location under new circumstances.

In some embodiments, the user can access the service outside of the vehicle, so the prediction engine can run on a computational platform different from an in-vehicle information system, including on a desktop computer, or a mobile device. In a different embodiment, the prediction engine can run on the information system 106 or on a network service, and a network connection can be used to access the prediction engine using a lightweight software client.

A user uses an interface 610, either in the car or outside the car, to enter parameters of the trip 640 that are known to the user, for example day of the week, time of the day when the car will be driven, likely weather for that location (average temperatures or specific forecast for dates immediately in the future). The input of the trip parameters 640 can be implemented by means of common user interface elements, such as input lists, calendars, text boxes, etc.

For parameters that cannot be specified in advance, such as gas tank levels, cabin temperature, etc., the driving history 630 can be used to determines 620 representative trip parameters 650 by searching the driving history for past trips similar to the trip parameters. In some embodiments, at least part of the representative trip parameters 650 can be computed using statistical functions such as average or sampling from the existing recorded driver history of that driver, either from the entire history, or from a selected portion of the history. The selected portion of the history can be one or more past trips found by searching for similarity to the trip parameters.

The parameters 640 and 650 are combined 645 to make one or more hypothetical driving states comprising the hypothetical scenario 660. Some embodiments determine more than one hypothetical scenario concurrently. The prediction engine 140 generates the prediction of the action 670 from the hypothetical scenario 660. The predictions are presented 680 to a user for research and planning based on the predictions.

For example, the output of the prediction engine can take the form of a list of recommended actions, connected to the equivalent functionality of a car navigation system. For example, when the recommended action is "Search for Fuel", when the user selects the corresponding list item, the user should see a list of the closest gas stations, similar to what a car navigation system would output when in use inside a car.

If the past driving habits of the driver contain regularities, such as a tendency to stop by a coffee shop between 8 am and 9 am, when the time of the day is set to morning, the prediction engine is likely to recommend a visit to a coffee shop. At that point, the driver can follow the recommendation by selecting the corresponding list item, with the search now applied to the point-of-interest (POI) database for the new location. The result can be a list of nearby coffee shops, and the driver would be able to see if they are conveniently located, carry a preferred brand of coffee, have suitable seating and various amenities of interest, such as WiFi, baby changing stations, etc. Checking this information in advance would reduce the cognitive load of the driver when actually driving at the new location, and reduce the chance of an accident.

In addition, for the same example, the driver can save one or more of the identified coffee shops as one of his/her favorites. This would make it more likely for the prediction engine to recommend such a favorite location directly, as opposed to going through an intermediate step of recommending a genre of place to visit. Other uses of simulation of the scenarios for the prediction engine are possible and within the scope of various embodiments of the invention.

The above-described embodiments of the present invention can be implemented in any of numerous ways. For example, the embodiments can be implemented using hardware, software or a combination thereof. When implemented in software, the software code can be executed on any suitable processor or collection of processors, whether provided in a single computer or distributed among multiple computers. Such processors can be implemented as integrated circuits, with one or more processors in an integrated circuit component. Though, a processor can be implemented using circuitry in any suitable format.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically the functionality of the program modules can be combined or distributed as desired in various embodiments.

Also, the embodiments of the invention can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An information system installed in a vehicle, comprising:
   a persistent storage device to store a driving history of a driver of the vehicle;
   a set of internal sensors to determine internal measurements;
   a receiver to receive, over a network, external measurements of a set of external sensors;
   a processor to determine, using one or combination of the internal and the external measurements, a set of driving state parameters and to update the driving history according to the set of driving state parameters; and
   a human-machine-interface (HMI) including input and output interfaces to modify a current or a historical value of the driving state parameter with a simulated value;
   wherein the processor further executes modules of the information system including a prediction engine and a simulation engine,
   wherein the prediction engine executed by the processor predicts an action based on the set of driving state parameters and the driving history,
   wherein the simulation engine executed by the processor generates a hypothetical scenario, the prediction engine predicts the action for the hypothetical scenario, and the processor renders the predicted action on an output device, and
   wherein the simulation engine executed by the processor generates the hypothetical scenario by initializing a set of driving state parameters based on the driving history, such that each driving state parameter is initialized with a corresponding current or historical value, rendering a subset of the set of driving state parameters to the interface, receiving, in response to the rendering, the simulated value forming a modified subset of driving state parameters, and merging the modified subset of driving state parameters with the set of driving state parameters for predicting the action.

2. The system of claim 1, further comprising:
   a driving history module for collecting the driving history of a vehicle or actions of the driver of the vehicle and for creating a prediction model for the prediction engine; and
   at least one sensor for determining the driving state parameter having a value independent from the driving history, wherein the simulation engine modifies the value of the driving state parameter.

3. The system of claim 2, further comprising:
   a system module using the driving state parameter, wherein the simulation engine modifies only a copy of the driving state parameter used by the prediction engine without modifying the driving state parameter used by the system module.

4. The system of claim 3, wherein the driving state parameter is a current location of a vehicle, wherein the system module is a navigation system of the vehicle, and the simulation engine changes the current location of the vehicle as used by the prediction engine without changing the current location of the vehicle used by the navigation system.

5. The system of claim 3, wherein the driving state parameter is a current time or a calendar date, wherein the system module is a clock or a calendar system of the vehicle, and the simulation engine changes the current time or the calendar date for the prediction engine without changing the current time or the calendar date used by the clock or the calendar system.

6. The system of claim 2, wherein the simulation engine modifies the prediction model without changing the driving history.

7. The system of claim 1, wherein the set of driving state parameters includes an external parameter received from an external sensor, and wherein the simulation engine modifies a received value of the external parameter.

8. The system of claim 1, further comprising:
   an output interface for rendering the set of driving state parameters used in a current prediction; and
   an input interface for modifying values of at least some driving state parameters in the set.

9. The system of claim 1, wherein the processor further executes
   an analytical module for performing an analysis of a set of actions predicted for a set of hypothetical scenarios and for determining a subset of driving state parameters based on the analysis.

10. The system of claim 9, wherein the output interface displays concurrently multiple actions and multiple corresponding hypothetical scenarios.

11. A method for using an information system installed in a vehicle, comprising:
    storing a driving history of a driver of the vehicle a persistent storage device of the vehicle;
    determining internal measurements using a set of internal sensors of the vehicle;
    receiving, over a network, external measurements of a set of external sensors;
    determining, using one or combination of the internal and the external measurements, a set of driving state parameters;
    updating the driving history according to the set of driving state parameters;
    modifying a current or a historical value of the driving state parameter with a simulated value received from a human-machine-interface (HMI) of the vehicle;
    generating a hypothetical scenario by initializing a set of driving state parameters based on the driving history, such that each driving state parameter is initialized with a corresponding current or historical value, rendering a subset of the set of driving state parameters to the interface, receiving, in response to the rendering, the simulated value forming a modified subset of driving state parameters, and merging the modified subset of driving state parameters with the set of driving state parameters;

predicting an action for the hypothetical scenario; and rendering the predicted action on an output device, wherein at least some steps of the method are performed by a processor.

* * * * *